US007974716B2

(12) United States Patent
Schumaier

(10) Patent No.: US 7,974,716 B2
(45) Date of Patent: Jul. 5, 2011

(54) PREPROGRAMMED HEARING ASSISTANCE DEVICE WITH PROGRAM SELECTION BASED ON PATIENT USAGE

(76) Inventor: Daniel R. Schumaier, Elizabethton, TN (US)

( * ) Notice: Subject to any disclaimer, the term of this patent is extended or adjusted under 35 U.S.C. 154(b) by 1079 days.

(21) Appl. No.: 11/739,781

(22) Filed: Apr. 25, 2007

(65) Prior Publication Data

US 2008/0267434 A1 Oct. 30, 2008

(51) Int. Cl.
*G06F 17/00* (2006.01)
*H04R 29/00* (2006.01)
*H04R 25/00* (2006.01)

(52) U.S. Cl. ............................ 700/94; 381/60; 381/314

(58) Field of Classification Search .................... 700/94; 381/60, 312, 314
See application file for complete search history.

(56) References Cited

U.S. PATENT DOCUMENTS 4,972,487 A 11/1990 Mangold et al.
6,035,050 A 3/2000 Weinfurtner et al.
6,104,822 A 8/2000 Melanson et al.
6,674,867 B2 1/2004 Basseas
6,682,472 B1 * 1/2004 Davis ............................. 600/25
6,741,712 B2 5/2004 Bisgaard
6,748,089 B1 6/2004 Harris et al.
6,785,394 B1 8/2004 Olsen et al.
6,829,363 B2 12/2004 Sacha
7,106,870 B2 9/2006 Meier et al.
2002/0015506 A1 2/2002 Aceti et al.
2005/0031145 A1 2/2005 Maltan et al.
2005/0111680 A1 * 5/2005 Meier et al. .................. 381/314
2007/0237346 A1 * 10/2007 Fichtl et al. .................. 381/314
2008/0170731 A1 * 7/2008 Wojas ........................... 381/312

FOREIGN PATENT DOCUMENTS

EP 1363473 11/2003
EP 1601232 11/2005

OTHER PUBLICATIONS

Harvey Dillon, Ph.D, Prescribing Hearing Aid Performance, 2001, 234-239, Chapter 9.

* cited by examiner

*Primary Examiner* — Vivian Chin
*Assistant Examiner* — Daniel R Sellers
(74) *Attorney, Agent, or Firm* — Luedeka, Neely & Graham, P.C.

(57) ABSTRACT

A programmable apparatus improves perception of sound by a person. In one embodiment, the apparatus includes a processor, digital-to-analog converter, audio output section and means for generating first and second control signals. The processor executes one or more available programs for processing digital audio signals based on control signals. The digital-to-analog converter generates output analog audio signals based on the digital audio signals. The audio output section receives and amplifies the output analog audio signals, generates audible sound based thereon and provides the audible sound to the person. The memory stores programs for processing the digital audio signals. Based on an action by the person, a first control signal is generated which causes the processor to switch from one available program to another available program so that the person may cycle through and evaluate each of the available programs. Also based on an action by the person, a second control signal is generated which causes the processor to designate at least one of the available programs as a chosen program for continued use.

20 Claims, 7 Drawing Sheets

PREPROGRAMMED HEARING ASSISTANCE DEVICE WITH PROGRAM SELECTION BASED ON PATIENT USAGE

FIELD

This invention relates to the field of hearing assistance devices. More particularly, this invention relates to a system for programming the operation of a hearing assistance device based on usage of the device by a patient.

BACKGROUND

Hearing loss varies widely from patient to patient in type and severity. As a result, the acoustical characteristics of a hearing aid must be selected to provide the best possible result for each hearing impaired person. Typically, these acoustical characteristics of a hearing aid are "fit" to a patient through a prescription procedure. Generally, this has involved measuring hearing characteristics of the patient and calculating the required amplification characteristics based on the measured hearing characteristics. The desired amplification characteristics are then programmed into a digital signal processor in the hearing aid, the hearing aid is worn by the patient, and the patient's hearing is again evaluated while the hearing aid is in use. Based on the results of the audiometric evaluation and/or the patient's comments regarding the improvement in hearing, or lack thereof, an audiologist or dispenser adjusts the programming of the hearing aid to improve the result for the patient.

As one would expect, the fitting procedure for a hearing aid is generally an interactive and iterative process, wherein an audiologist or dispenser adjusts the programming of the hearing aid, receives feedback from the patient, adjusts the programming again, and so forth, until the patient is satisfied with the result. In many cases, the patient must evaluate the hearing aid in various real world situations outside the audiologist's or dispenser's office, note its performance in those situations and then return to the audiologist or dispenser to adjust the hearing aid programming based on the audiologist's or dispenser's understanding of the patient's comments regarding the patient's experience with the hearing aid.

One of the significant factors in the price of a hearing aid is the cost of the audiologist's or dispenser's services in fitting and programming the device, along with the necessary equipment, such as software, computers, cables, hyproboxes, etc. If the required participation of the audiologist and/or dispenser and the fitting equipment can be eliminated or at least significantly reduced, the cost of a hearing aid can be significantly reduced.

The complexity and cost of fitting hearing assistance devices in general also applies in the fitting of tinnitus masking devices. Tinnitus is a condition wherein a person experiences a sensation of noise (as a ringing or roaring) that is caused from a condition (such as a disturbance of the auditory nerve, hair cells, temporal mandibular joint or medications, to name a few. Tinnitus is a significant problem for approximately 50 million people each year, and some people only find relief with tinnitus maskers. A tinnitus masker looks like a hearing aid, but instead of amplifying sensed sound, it produces a sound, such as narrow-band noise, that masks the patient's tinnitus. Some of these instruments have a trim pot that is used to change the frequency of the masking noise. Such instruments may also have a volume control so the user may select the intensity of the masking that works best.

Most tinnitus maskers are prescribed to patients who do not have significant hearing loss, and the masking sound is designed to be more acceptable to the patient than the tinnitus. For most patients that have significant hearing loss, hearing aids can also provide tinnitus relief. However, there are some patients that need both amplification and tinnitus masking.

The most appropriate masking stimuli to be generated by a tinnitus masker is usually determined by an audiologist or dispenser during a fitting procedure. Like the fitting of a hearing aid, the fitting procedure for a tinnitus masker also tends to be an iterative process which significantly increases the overall cost of the masking device.

What is needed, therefore, is a programmable hearing assistance device that does not require a fitting procedure conducted by an audiologist or dispenser. To obviate the necessity of the programming equipment and the necessity of an audiologist or dispenser fitting procedure, a programmable hearing assistance device is needed which is automatically programmed based on selections made by a patient while using the device or based on usage patterns of the patient. This need applies to hearing aids as well as to tinnitus masking devices.

SUMMARY

The above and other needs are met by a programmable apparatus for improving perception of sound by a person. In one embodiment, the apparatus includes a processor, digital-to-analog converter, audio output section and means for generating first and second control signals. The processor executes one or more available programs for processing digital audio signals based on control signals. The digital-to-analog converter generates output analog audio signals based on the digital audio signals. The audio output section receives and amplifies the output analog audio signals, generates audible sound based thereon and provides the audible sound to the person. The memory stores programs for processing the digital audio signals according to various acoustical configurations or with tinnitus masking stimuli. Based on an action by the person, a first control signal is generated for switching from one available program to another available program. Also based on an action by the person, a second control signal is generated for designating at least one of the available programs as a chosen program. Based on the first control signal, the processor ceases execution of one of the available programs and commences execution of another of the available programs. Based on the second control signal, the processor designates at least one of the available programs as a chosen program for continued use.

In preferred embodiments, the means for generating the first and second control signals comprise a momentary push button switch and a controller. When activated by the person, the momentary push button switch changes from a first state to a second state. The controller generates the control signals based on periods of time during which the momentary push button switch is held in the second state. For example, the controller generates the first control signal when the momentary push button switch is held in the second state for a period of time exceeding a first time. The controller generates the second control signal when the momentary push button switch is held in the second state for a period of time exceeding a second time.

In one embodiment, the programmable apparatus is a hearing aid device and the one or more available programs comprise acoustical configuration programs. In another embodiment, the programmable apparatus is a tinnitus masking device and the one or more available programs comprise masking stimuli programs. In yet another embodiment, the programmable apparatus is a combination hearing aid device and tinnitus masking device, and the one or more available programs comprise acoustical configuration programs and masking stimuli programs.

In some embodiments, the programmable apparatus includes a timer for timing how long each of the available programs is used in processing digital audio signals. Based on how long each of the available programs is used, the processor designates at least one of the available programs as a chosen program for continued use.

In another aspect, the invention provides a method for improving perception of sound by a person. The method includes steps of (a) storing in a memory device one or more available programs for processing digital audio signals, (b) processing the digital audio signals based on execution of the one or more available programs, (c) generating output analog audio signals based on the digital audio signals, (d) receiving and amplifying the output analog audio signals to generate audible sound based thereon, (e) generating a first control signal to switch from one available program to another available program based upon an action by the person, (f) generating a second control signal to designate at least one of the available programs as a chosen program based upon an action by the person, (g) ceasing execution of one of the available programs and commencing execution of another of the available programs based on the first control signal, and (h) designating at least one of the available programs as a chosen program based on the second control signal.

Further details of each of these and other embodiments of the invention are provided in the drawings and in the detailed description.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
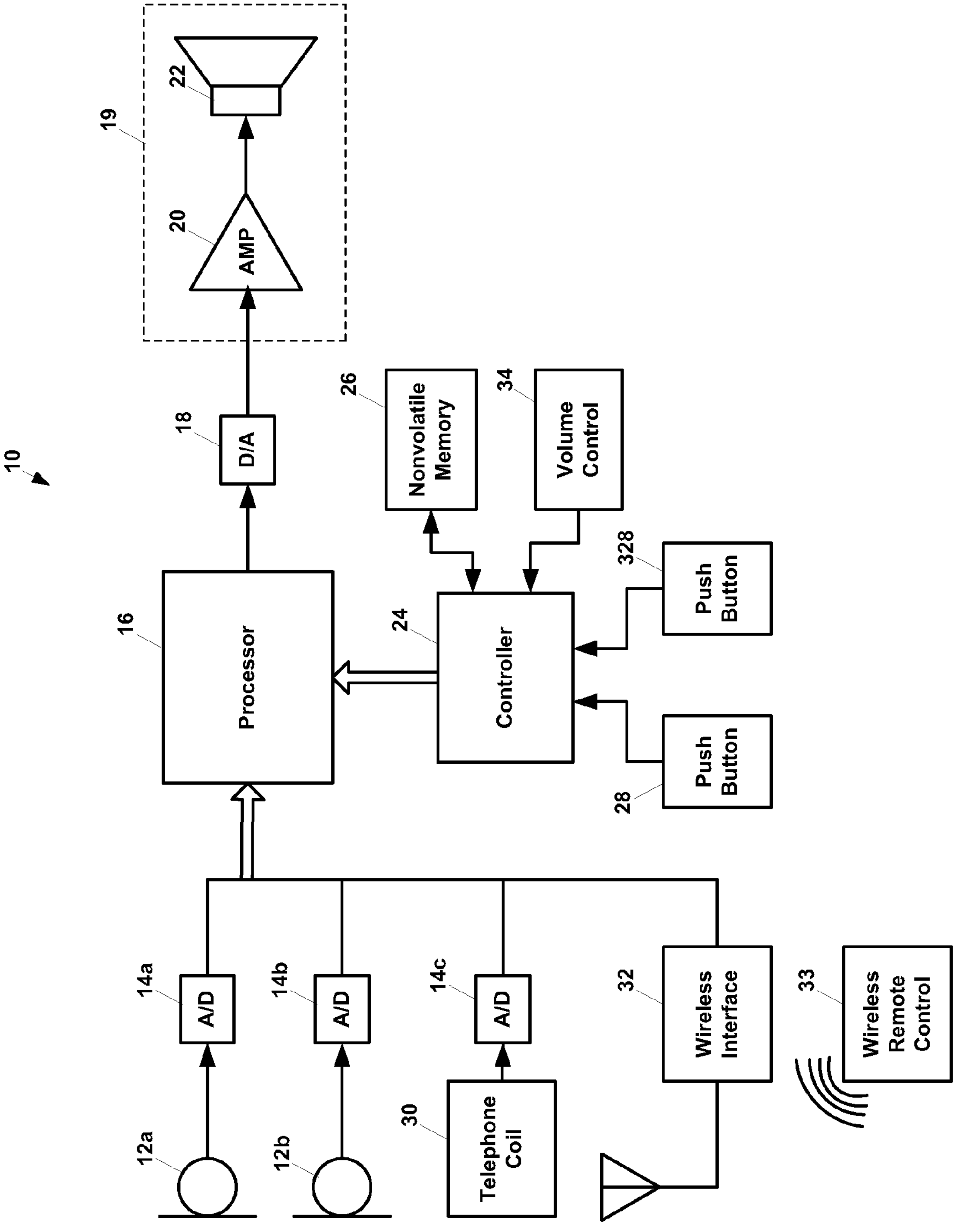
FIG. 1 depicts a functional block diagram of a hearing assistance device according to a preferred embodiment of the invention.
Figure 6:
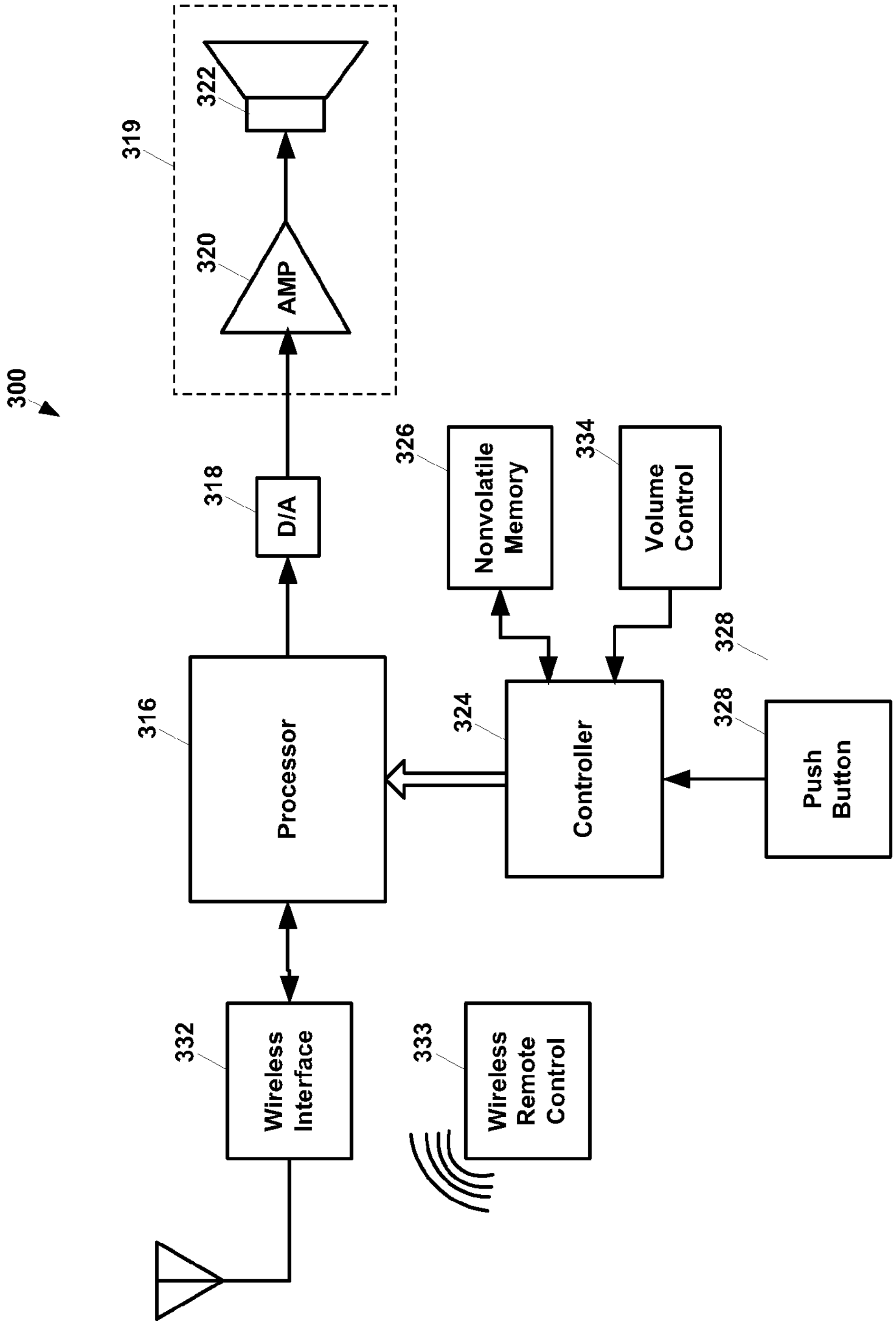
FIG. 6 depicts a functional block diagram of a tinnitus masking device according to a preferred embodiment of the invention.

FIG. 1 depicts one embodiment of a hearing assistance device 10 for improving the hearing of a hearing-impaired patient. The device 10 of FIG. 1 is also referred to herein as a hearing aid. Another embodiment of a hearing assistance device is a tinnitus masking device as shown in FIG. 6 which is discussed in more detail hereinafter.

As shown in FIG. 1 the hearing assistance device 10 includes one or more microphones 12*a-b* for sensing sound and converting the sound to analog audio signals. The analog audio signals generated by the microphones 12*a-b* are converted to digital audio signals by analog-to-digital (A/D) converters 14*a*-14*b*. The digital audio signals are processed by a digital processor 16 to shape the frequency envelope of the digital audio signals to enhance those signals in a way which will improve audibility for the wearer of the hearing assistance device. Further discussion of various programs for processing the digital audio signals by the processor 16 is provided below. Thus, the processor 16 generates digital audio signals that are modified based on the programming of the processor 16. The modified digital audio signals are provided to a digital-to-analog (D/A) converter 18 which generates analog audio signals based on the modified digital audio signals. The analog audio signals at the output of the D/A converter 18 are amplified by an audio amplifier 20, where the level of amplification is controlled by a volume control 34 coupled to a controller 24. The amplified audio signals at the output of the amplifier 20 are provided to a sound generation device 22, which may be an audio speaker or other type of transducer that generates sound waves or mechanical vibrations which the wearer perceives as sound. The amplifier 20 and sound generation device 22 are referred to collectively herein as an audio output section 19 of the device 10.

With continued reference to FIG. 1, some embodiments of the invention include a telephone coil 30. The telephone coil 30 is small coil of wire for picking up the magnetic field emitted by the ear piece of some telephone receivers or loop induction systems when the hearing assistance device 10 is disposed near such a telephone receiver or loop induction system. Signals generated by the telephone coil 30 are converted to digital signals by an A/D converter 14*c* and are provided to the processor 16. As discussed in more detail below, the converted digital signals from the telephone coil 30 may be used in some embodiments of the invention for resetting or reprogramming the processor 16, or controlling the operation of the hearing assistance device 16 in other ways.

Some embodiments of the invention also include a wireless interface 32, such as a Bluetooth interface, for receiving wireless signals for resetting or reprogramming the processor 16. In some embodiments, the wireless interface 32 is also used to control the operation of the device 10, including selection of acoustical configuration programs or masking stimuli programs. The wireless interface 32 may also be used to wirelessly deliver an audio signal to the device 10, such as a music signal transmitted from a wireless transmitter attached to a CD player, or the audio portion of a television program transmitted from a wireless transmitter connected to a television tuner. In various embodiments, the wireless interface 32 comprises a WiFi link according to the IEEE 802.11 specification, an infrared link or other wireless communication link.

As shown in FIG. 1, a manually operated input device 28, also referred to herein as a momentary switch or push button, is provided for enabling the wearer to control various aspects of the operation and programming of the hearing assistance device 10. The push button 28 is preferably very small and located on an outer surface of a housing associated with the device 10. The push button 28 is located on a portion of the housing that is accessible to the wearer while the wearer is wearing and using the device 10.

For example, the device 10 may be configured as a behind-the-ear (BTE), in-the-ear (ITE) instrument, with the push button 28 located on an accessible surface of the BTE or ITE instrument. An example of a hearing aid having BTE and ITE portions is described in U.S. Patent Application Publication 2006/0056649, where reference number 34 of FIG. 1 of that publication indicates one possible location for a push button switch on the BTE portion of a hearing aid. The push button 28 may also be located on the ITE portion. It will be appreciated that the invention is not limited to any particular configuration of the device 10. In various embodiments, the device 10 may comprise an open fit hearing aid, a canal hearing aid, a half-shell configuration, a BTE device, an ITE device or a completely in canal (CIC) device.

The push button 28 is electrically connected to a controller 24 which generates digital control signals based on the state (open or closed) of the switch of the push button 28. In a preferred embodiment of the invention, the digital control signals are generated by the controller 24 based on how long the push button 28 is pressed. In this regard, a timer is included in the controller 24 for generating a timing signal to time the duration of the pressing of the button 28. Further aspects of the operation of the controller 24 and the push button 28 are described in more detail below.

A second push button 328 may be included in embodiments of the invention that combine hearing aid functions with tinnitus masking functions. In these embodiments, a push button 328 is used to control the selection of tinnitus masking programs as described in more detail hereinafter. Alternatively, a single push button may be used for first programming the hearing aid functions and then programming the tinnitus masking functions.

Nonvolatile memory 26, such as read-only memory (ROM), programmable ROM (PROM), electrically erasable PROM (EEPROM), or flash memory, is provided for storing programming instructions and other operational parameters for the device 10. Preferably, the memory 26 is accessible by the processor 16 and/or the controller 24.

According to preferred embodiments of the invention, the hearing assistance device 10 is operable in several different modes as determined by its programming. As the terms are used herein, "programs" and "programming" refers to one or more sets of instructions that are carried out by the processor 16 in shaping the frequency envelope of digital audio signals to enhance those signals to improve audibility for the wearer of the hearing assistance device 10. "Programs" and "programming" also refers to the instructions carried out by the processor 16 in determining which of several stored enhancement programs provides the best improvement for the wearer. FIGS. 2-5 depict the process flow of some exemplary methods for selecting the most effective hearing enhancement program for the wearer.

Figure 2:
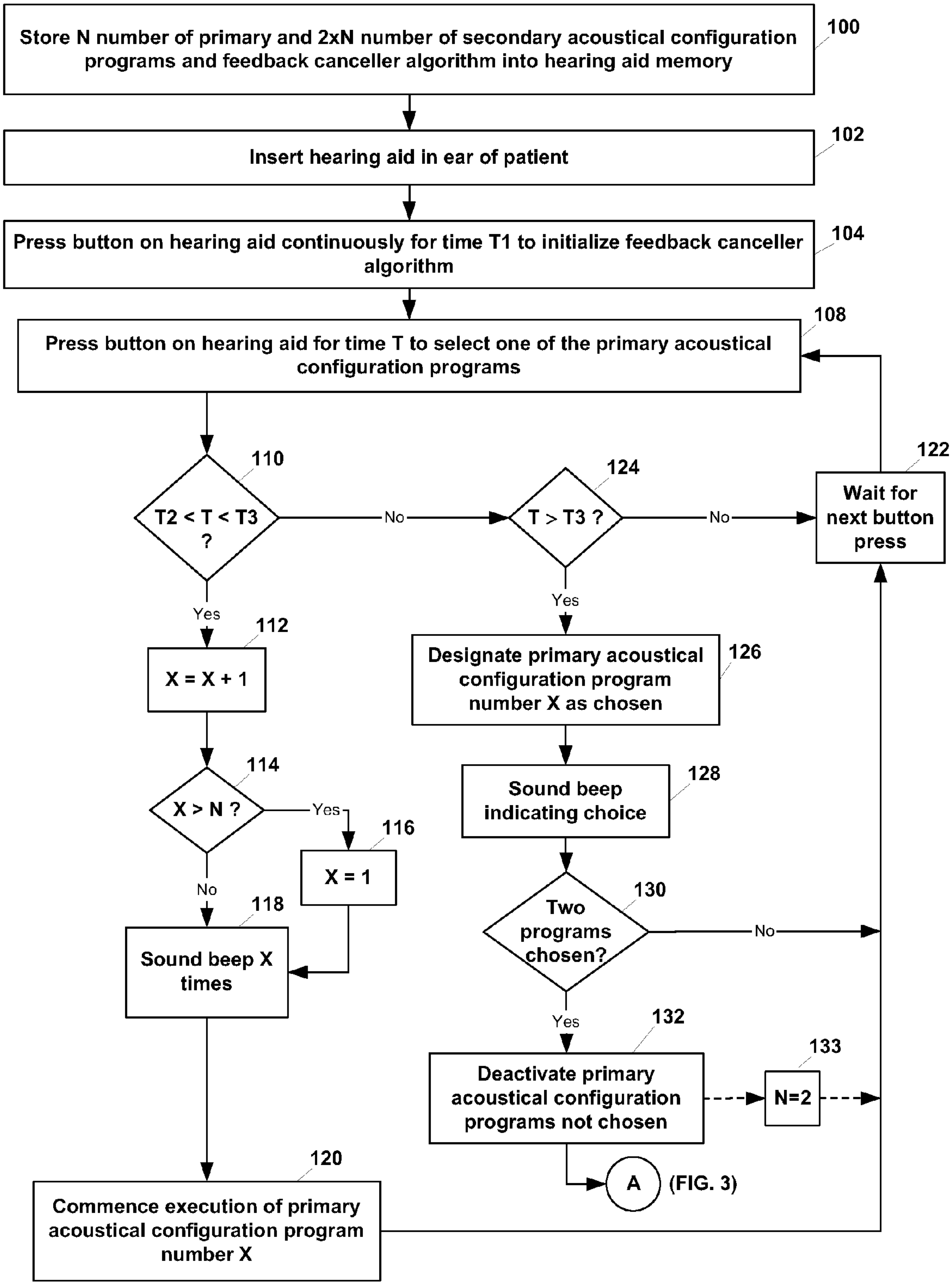
FIGS. 2 and 3 depict a functional flow diagram of the programming of a hearing assistance device according to a first embodiment of the invention.
Figure 3:
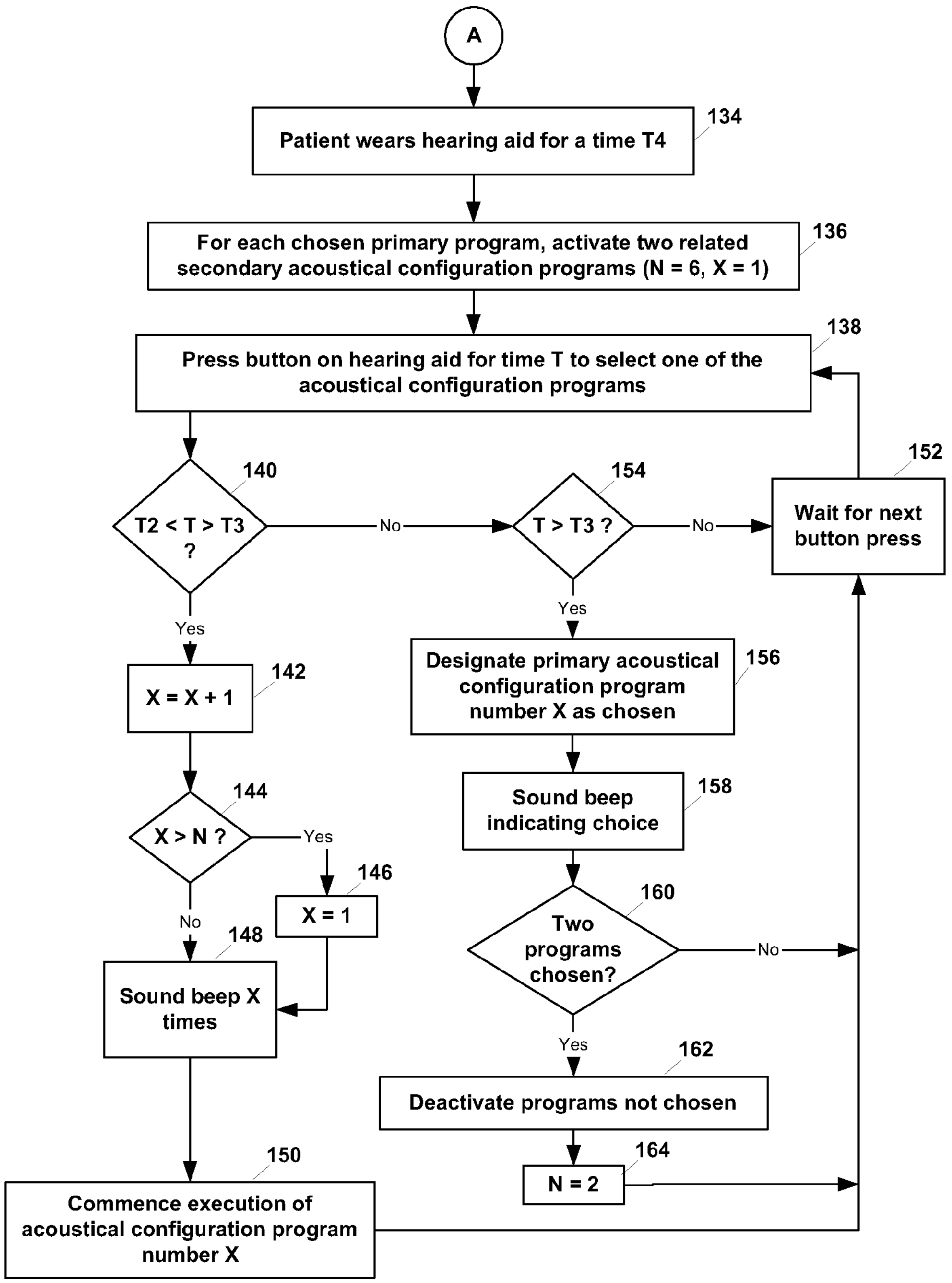

FIGS. 2 and 3 depict a process flow according to one preferred embodiment of the invention wherein the selection of the most effective enhancement program is based upon a "trial and error" interactive and iterative method, where the wearer of the device evaluates several options for enhancement programs and chooses one or more programs that provide the best enhancement for the individual wearer. As shown in FIG. 2, a first step in the method is to store in memory 26 some number (N) of primary acoustical configuration programs for shaping the acoustical characteristics of the hearing assistance device 10 (step 100). This step may be performed at the time of manufacture of the hearing assistance device 10 or at a later time, such as during a reprogramming procedure. In a preferred embodiment of the invention, seven primary acoustical characteristic configuration programs are loaded into the memory 26 (N=7). However, it will be appreciated that any number of programs may be initially loaded into memory 26, and the invention is not limited to any particular number.

As the phrase is used herein, a "primary acoustical characteristic configuration program" is an algorithm that sets the audio frequency shaping or compensation provided in the processor 16. These programs or algorithms may also be referred to by audiologists or dispensers as "gain-frequency response prescriptions." Examples of generally accepted primary acoustical configuration programs include NAL (National Acoustic Laboratories; Bryne & Tonisson, 1976), Berger (Berger, Hagberg & Rane, 1977), POGO (Prescription of Gain and Output; McCandless & Lyregaard, 1983), NAL-R (NAL-Revised; Byrne & Dillon, 1986), POGO II (Schwartz, Lyregaard & Lundh, 1988), NAL-RP (NAL-Revised, Profound; Byrne, Parkinson & Newall, 1991), FIG. 6 (Killion & Fikret-Pasa, 1993) and NAL-NL1 (NAL nonlinear; Dillon, 1999). It will be appreciated that other primary acoustical configuration programs could be used in association with the methods described herein, and the above list should not be construed as limiting the scope of the invention in any way.

A "secondary acoustical characteristic configuration program" as that phrase is used herein refers to a variation on one of the primary programs. For example, in one of the primary programs, a parameter for gain at 1000 Hz may be set to a value of 20 dB which is considered to be in or near the center of a range for an average hearing loss patient. In an example of a related secondary program, the parameter for gain at 1000 Hz may be set to a value of 25 dB which is just above the "standard" value. Accordingly, another related secondary program may have the parameter for gain at 1000 Hz set to a value of 15 dB which is just below the "standard" value. There may be any number of secondary programs that include various variations of parameters which in the associated primary program are set to a standard or average value. Preferably, 2×N number of secondary acoustical configuration programs are loaded into memory at step 100. For example, there may be two secondary programs associated with each primary program.

In the preferred embodiment of the invention, a feedback canceller algorithm is also stored in the memory 26 of the device 10. An example of a feedback canceller algorithm is described in U.S. Patent Application Publication 2005/0047620 by Robert Fretz. As described in more detail below, such an algorithm is used to set the acoustical gain levels in the processor 16 and/or the amplifier 20 to avoid audio feedback in the device 10.

At some point after the initial programming of the device (step 100), a wearer inserts the device 10 into the ear canal (in the case of an ITE device) or places the device 10 behind the ear (in the case of a BTE device) with the associated connections to the ear canal (step 102). Once the device 10 is in position, the wearer presses the button 28 for some extended period of time T1, such as 60 seconds, to activate the device 10 and initialize the feedback canceller program (step 104). According to a preferred embodiment of the invention, the feedback canceller program generates and stores acoustical coefficients that will be applicable to all of the primary and secondary acoustical configuration programs stored in the memory 26.

Once the feedback canceller program has performed its initialization procedure, the wearer can cycle through the N number of available primary acoustical configuration programs and try each to determine which provides the best enhancement for the wearer's hearing loss. The wearer does this by pressing the button 28 for at least some period of time T2, such as one second, to switch from one program to the next (step 108). For example, a first program may be executed by the processor 16 when the device 10 is first powered on. When the wearer presses the button 28 for at least one second, a second program is executed by the processor 16 (step 120). In some embodiments, the device 10 generates two beeps (step 118) to indicate to the selection of the second program. When the wearer presses the button 28 again for at least one second, a third program is executed by the processor 16 (step 120) and the device 10 generates three beeps to indicate that the third program is selected. This continues until the wearer has cycled through the N number of programs (such as seven). If the wearer presses the button 28 again for at least one second, the first program is loaded again. This process is represented by steps 108-122 of FIG. 2. To cycle through programs quickly, the wearer may press the button 28 several times consecutively until the desired program is selected. At this point, some number of beeps are generated to indicate which program is selected.

If it is determined that the button 28 is pressed for less than one second (step 110), then no new program is loaded and the process waits for the next button press (step 122). This prevents inadvertent switching from one program to the next due to an accidental press of the button 28.

Once the wearer has had a chance to evaluate all of the available primary programs, the wearer may find that some smaller number of the programs, such as two, seem to be used most because they provide the best hearing enhancement for the user in various situations. For example, one of the programs may provide the best performance in normal quiet conversation settings. Another of the programs may provide the best performance in a noisy setting, such as in a crowded room. A preferred embodiment of the invention allows the user to eliminate programs that are not used or rarely used, and to evaluate some secondary programs that are variations on the best performing programs. As described below, this is accomplished by pressing the push button 28 for a time T3, such as 30 seconds, which is longer than the time T2.

As shown in FIG. 2, if it is determined that the button 28 is pressed for a time T3 or longer (step 124), such as 30 seconds, the processor 16 sets a flag or stores a value indicating that the currently-loaded primary program has been designated as a chosen program (step 126). At this point, the device 10 generates a distinctive sound (step 128) to indicate to the wearer that a program has been chosen. In a preferred embodiment, the device 10 allows the user to choose two of the N number of primary acoustical configuration programs. However, it will be appreciated that the device 10 could accommodate designation of more or fewer than two primary acoustical configuration programs as chosen. If it is determined at step 130 that two programs have not yet been chosen, the process waits for the next press of the button 28 (step 122).

In an alternative embodiment of the invention, instead of pressing the button 28 to choose a program, the wearer presses the button 28 for at least time T3 to deactivate a non-chosen program. Thus, it will be appreciated that the invention is not limited to the manner in which programs are designated as chosen or not chosen.

If it is determined at step 130 that two primary acoustical configuration programs have been chosen, then the primary programs that have not been chosen are deactivated (step 132 in FIG. 3). Deactivation in this sense means that the non-chosen programs are made unavailable for selection and execution using the procedure of repeated pressing of the button 28. Thus, at this point, two primary programs are available for selection and execution.

After the wearer has used the device 10 for some extended period of time T4 (step 134), such as 80 hours, two secondary acoustical configuration programs are activated for each of the prioritized primary programs. For example, if two primary programs have been chosen by way of the user selection process of steps 124-130, then four secondary programs are activated at step 136, resulting in a total of six available programs (N=6). Activation of a program in this sense means to make a program available for selection and execution. In a preferred embodiment of the invention, each of the two newly-added secondary programs are variations on a corresponding one of the chosen primary programs. This allows the wearer to make a more refined selection so as to "fine tune" the desired acoustical response. At this point in this example, the wearer has six available programs to evaluate and the user can cycle through the six programs using the button pressing procedure depicted in steps 138-152 of FIG. 3. This procedure is essentially the same as the procedure of steps 108-122 of FIG. 2.

Once the wearer has had a chance to try and compare the six available programs (two primary and four secondary), the wearer can choose the two programs that provide the best performance and deactivate the rest. This is accomplished by pressing the push button 28 for a time T3, such as 30 seconds. As shown in FIG. 3, if it is determined that the button 28 is pressed for a time T3 or longer (step 154), the processor 16 sets a flag or stores a value indicating that the currently-loaded program has been designated as chosen (step 156). At this point, the device 10 generates a distinctive sound (step 158) to indicate to the wearer that a program has been chosen. In a preferred embodiment, the device 10 allows the user to choose two of the N number of available programs. However, it will be appreciated that the device 10 could accommodate the choice of more or fewer than two programs.

If it is determined at step 160 that two programs have not yet been chosen, the process waits for the next press of the button 28 (step 152). If it is determined at step 160 that two programs have been chosen, then the other four non-chosen programs are deactivated (step 162 in FIG. 3). At this point, the two best-performing programs as determined by the wearer are available for continued use. (N=2, step 164.) The wearer can now switch between the two available programs using the button pressing procedure of steps 138-152.

In some embodiments of the invention, there is no process for activating and choosing secondary acoustical configuration programs. In such embodiments, the wearer chooses some number of best performing primary programs (such as N=2) and the thereafter the wearer can switch between those chosen primary programs. This is represented by the dashed line from the box 132 in FIG. 2 with continuation at step 122. Thus, in these embodiments, processing does not proceed to step 134 in FIG. 3.

In preferred embodiments of the invention, the programming of the hearing assistance device 10 can be reset to default (factory) conditions by the wearer. In one embodiment, the reset is initiated by pressing the push button 28 for an extended time T5, such as two minutes, which is significantly longer than T3. In another embodiment, the reset is initiated by closing a battery compartment door while simultaneously pressing the button 28. This embodiment includes a switch coupled to the battery compartment door, where the status of the switch is provided to the controller 24. In another embodiment, the reset is initiated by a Dual-Tone Multi-Frequency (DTMF) telephone code received by the telephone coil 30 or microphone 12*a* or 12*b*. In yet another embodiment, the reset is initiated by a coded wireless signal received by the wireless interface 32. In some embodiments, more than one of the above procedures are available for resetting the programming of the device 10.

As described above, in preferred embodiments of the invention, a wearer switches between available programs and chooses programs using the manually operated push button 28 mounted on a housing of the device 10. In alternative embodiments of the invention, the wearer switches between available programs and chooses programs using a wireless remote control device 33, such as an infrared, radio-frequency or acoustic remote control. In these alternative embodiments, a push button is provided on the remote control device 33, and the program selection and choosing process proceeds in the same manner as described above except that the wearer uses the push button on the remote control device 33 rather than a button mounted on the housing of the device 10. In an embodiment including an acoustic remote control, coded acoustic signals, such as a series of clicks in a machine recognizable pattern, may be used to deliver commands to the device 10. Such acoustic control signals may be received by one or both of the microphones 14*a*-14*b* and provided to the processor 16 for processing.

In yet another embodiment incorporating voice recognition technology, the wearer switches between available programs and chooses programs by speaking certain "code words" that are received by one or more of the microphones 12*a*-12*b*, converted to digital control signals and processed by the processor 16 to control operation of the device 10. For example, the spoken phrase "switch program" may be interpreted by the processor 16 in the same manner as a push of the button 28 for a time T2, and spoken phrase "choose program" may be interpreted by the processor 16 in the same manner as a push of the button 28 for a time T3.

Figure 4:
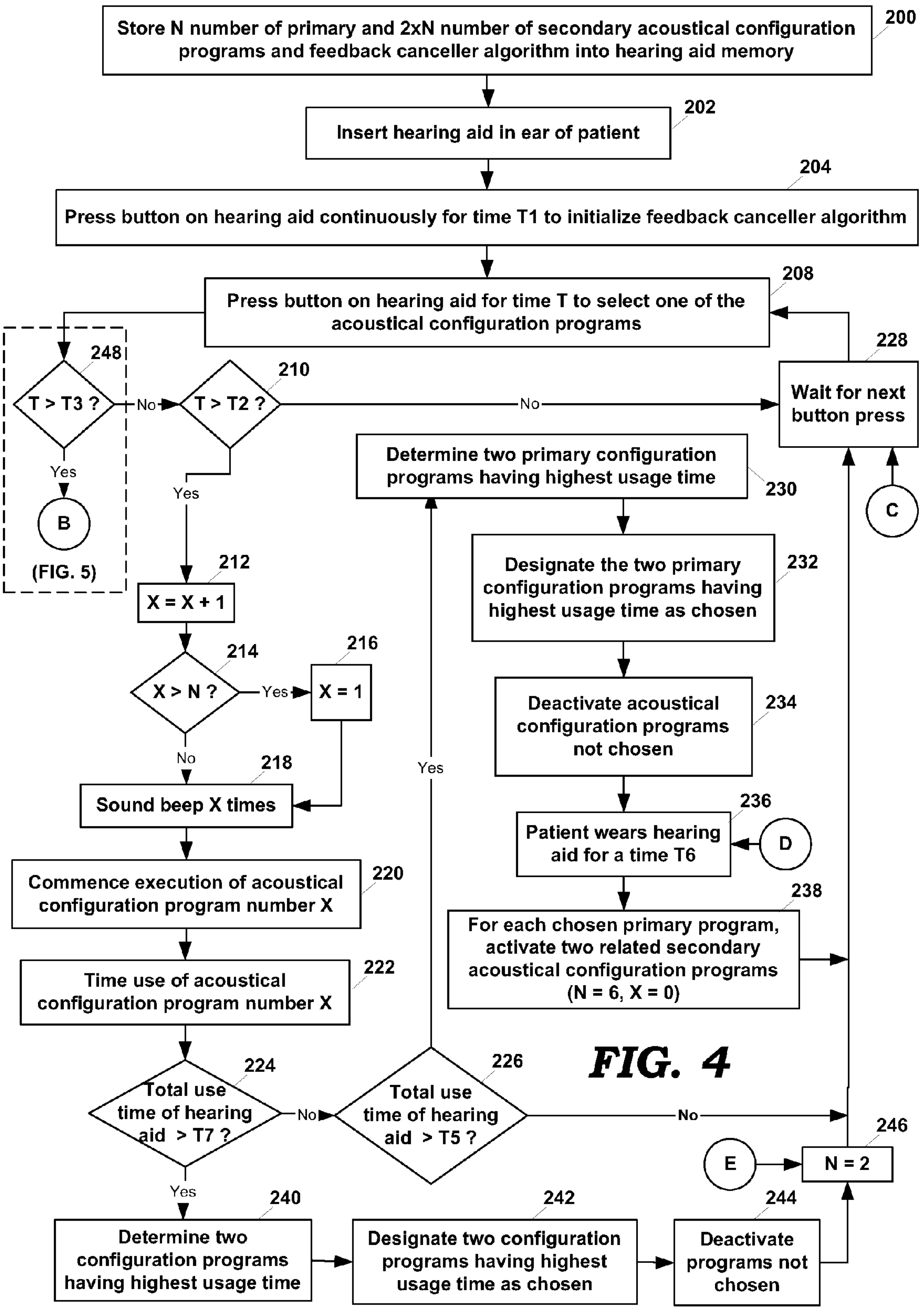
FIGS. 4 and 5 depict a functional flow diagram of the programming of a hearing assistance device according to a second embodiment of the invention.
Figure 5:
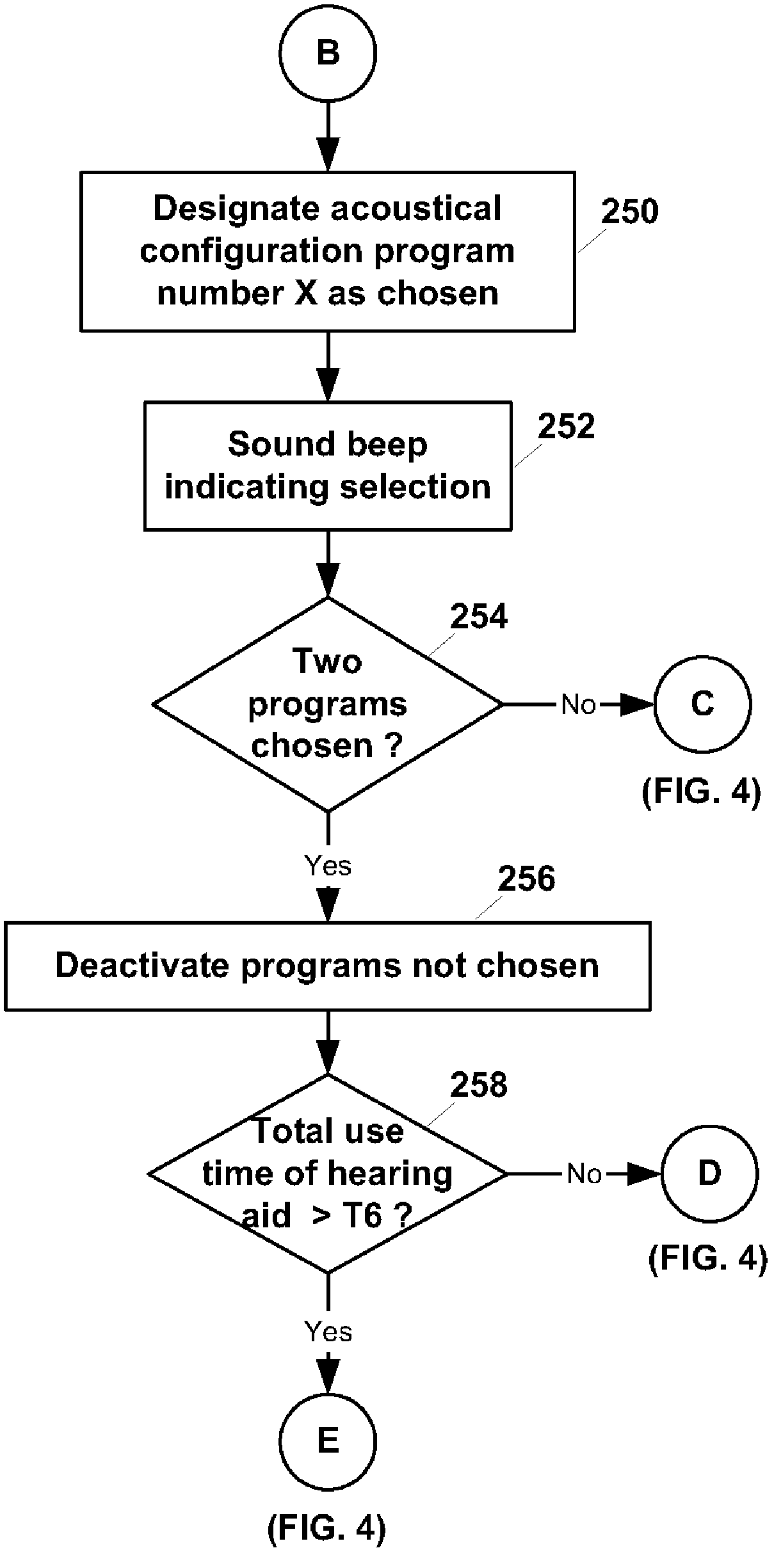

FIGS. 4 and 5 depict a process flow according to another preferred embodiment of the invention wherein the designation of the most effective enhancement programs is based upon a method wherein the wearer of the device evaluates several options for enhancement programs and the device 10 keeps track of how long the wearer uses each program. With this embodiment, the basic assumption is that the program which provides the best performance for the wearer will be the program used most during the evaluation period. As described below, a variation on this embodiment allows the wearer to "override" the time-based designation process and manually choose one or more programs that provide the best performance. This override feature may be provided as an optional operational mode.

As shown in FIG. 4, a first step in the method is to store in memory 26 some number (N) of primary acoustical configuration programs and 2×N number of secondary programs (step 200). This step may be performed at the time of manufacture of the hearing assistance device 10 or at a later time, such as during a reprogramming procedure. In a preferred embodiment of the invention, seven primary programs and fourteen secondary programs are loaded into the device memory 26 (N=7, 2×N=14). However, it will be appreciated that any number of programs may be initially loaded into memory 26, and the invention is not limited to any particular number. In the preferred embodiment of the invention, a feedback canceller algorithm is also stored in the memory 26 of the device 10 at step 200.

At some point after the initial programming of the device (step 200), a wearer inserts the device 10 into the ear canal (in the case of an ITE device) or places the device 10 behind the ear (in the case of a BTE device) with the associated connection to the ear canal (step 202). Once the device 10 is in position, the wearer presses the button 28 for some extended period of time T1, such as 60 seconds, to activate the device 10 and initialize the feedback canceller program (step 204). According to a preferred embodiment of the invention, the feedback canceller program generates and stores acoustical coefficients that will be applicable to all of the primary and secondary acoustical configuration programs stored in the memory 26.

Once the feedback canceller program has performed its initialization procedure, the wearer can cycle through the N number of available primary acoustical configuration programs and try each to determine which provides the best enhancement for the wearer's hearing loss. The wearer does this by pressing the button 28 for at least some period of time T2, such as one second, to switch from one program to the next (step 208). For example, a first program may be executed by the processor 16 when the device 10 is first powered on. When the wearer presses the button 28 for at least one second, a second program is executed by the processor 16 (step 220). In some embodiments, the device 10 generates two beeps (step 218) to indicate to the selection of the second program. When the wearer presses the button 28 again for at least one second, a third program is executed by the processor 16 (step 220) and the device 10 generates three beeps to indicate that the third program is selected. This continues until the wearer has cycled through the N number of programs (such as seven). If the wearer presses the button 28 again for at least one second, the first program is loaded again. This process is represented by steps 208-228 of FIG. 4. To cycle through programs quickly, the wearer may press the button 28 several times consecutively until the desired program is selected. At this point, some number of beeps are generated to indicate which program is selected.

As with the previously described embodiment, if it is determined that the button 28 is pressed for less than one second (step 210), then no new program is loaded for execution and the process waits for the next button press (step 228). This prevents inadvertent switching from one program to the next due to an accidental press of the button 28.

In the embodiment of FIG. 4, a timer circuit is used to time how long each selected primary program is used (step 222). The total time of use of each primary program is logged in memory and is continuously updated as the wearer switches from one program to another. After the wearer has used the device 10 for some extended period of time T5, such as 80 hours (step 226), a calculation is made based on the logged time information to determine which two primary programs have been used most during the T5 period (step 230). The two primary programs having the highest usage time are then designated as chosen (step 232) and the remaining primary programs are deactivated (step 234). The wearer then uses the device 10 with the two chosen primary programs activated for a period of time T6, such as 80 hours (step 236). During this time, the wearer can switch between the two programs as desired.

At the end of the T6 period, the wearer has used the device 10 for a total time of T5+T6, such as 160 hours total. At this point, two secondary acoustical configuration programs are activated for each of the two active primary programs, resulting in a total of six available programs (N=6) (step 238). In a preferred embodiment of the invention, each of the two newly-added secondary programs is a variation on a corresponding one of the two most-used primary programs. This allows the wearer to make a more refined selection so as to "fine tune" the desired acoustical response. At this point in this example, the wearer has six available programs to evaluate and the wearer can again cycle through the available programs using the button pressing procedure depicted in steps 208-228 of FIG. 4.

During the evaluation period of the N number of available primary and related secondary programs, the timer circuit is again used to time how long each program is loaded for use (step 222). The total time of use of each program is logged in memory and is continuously updated as the wearer switches from one program to another. After the wearer has used the device 10 for a total period of time T7 (such as 240 hours, which is significantly greater than the sum of T5+T6) (step 224), a calculation is made based on the logged time information to determine which two of the N number of available programs have been used most since the secondary programs were activated (step 240). The two programs having the highest usage time are then designated as chosen (step 242) and the remaining programs are deactivated (step 244). At this point, the two most-used programs as determined by the time-logging procedure are available for continued use. (N=2, step 246.) The wearer can now switch between the two available programs using the button pressing procedure of steps 208-228.

As mentioned above, a preferred embodiment of the invention allows a wearer to override the time-based selection process and to manually choose one or more programs that provide the best performance for the wearer. This override option is depicted in FIG. 5 and the dashed box portion of FIG. 4. At step 248, if it is determined that the button 28 is pressed for a time T3 or longer, such as 30 seconds, the processor 16 sets a flag or stores a value indicating that the currently-loaded program has been designated as chosen (step 250 in FIG. 5). At this point, the device 10 generates a distinctive sound (step 252) to indicate to the wearer that a program has been chosen. In a preferred embodiment, the device 10 allows the user to choose two of the available acoustical configuration programs. However, it will be appreciated that the device 10 could accommodate the choice of more or fewer than two acoustical configuration programs.

If it is determined at step 254 that two primary programs have not yet been chosen, the process waits for the next press of the button 28 (step 228 in FIG. 4). If it is determined at step 254 that two primary programs have been chosen, then the non-chosen primary programs are deactivated (step 256 in FIG. 5). Thus, at this point, two primary programs are available for use. If the wearer has not yet used the device 10 for at least a total period of time T6 (such as 80 hours) (step 258), then processing continues at step 236 of FIG. 4.

After the wearer has used the device 10 for a time T6 (such as 80 hours) with two primary programs designated as chosen, two secondary programs are activated for each of the two active primary programs, resulting in a total of six available programs (N=6) (step 238). At this point in this example, the wearer again has six available programs from which to choose, and the wearer can again cycle through the six available programs using the button pressing procedure depicted in steps 208-228 of FIG. 4. In this embodiment, the time-logging processing continues as described above unless and until the wearer overrides the procedure by pressing the button 28 for longer than time T3 (step 248). This transfers processing back to step 250 of FIG. 5 where the processor 16 sets a flag or stores a value indicating that the currently-loaded program has been designated as chosen. Once two programs have been chosen (step 254), the non-chosen primary and secondary programs are deactivated (step 256), leaving two programs available for selection.

At this point, the wearer has used the device 10 for at least a total period of time T6 (such as 80 hours) (step 258), so that processing continues at step 246 of FIG. 4. Two programs are now available for continued use. These two programs were chosen based on the time-logging procedure, or the override procedure, or a combination of both. The wearer can now switch between the two available programs as desired using the button pressing procedure of steps 208-228. If so desired, the programming of the device 10 may be reset to default conditions as described above using the button 28, the wireless interface 32 or the telephone coil 30, as described above.

FIG. 6 depicts one embodiment of a hearing assistance device 300 for masking tinnitus. The device 300, which is also referred to herein as a tinnitus masker, includes a digital processor 316 for processing digital audio signals, such as masking stimuli signals. In one preferred embodiment of the invention, the masking stimuli signals comprise narrow-band audio noise. The audio frequencies of these noise signals generally fall into the human audible frequency range, such as in the 20-20,000 Hz band. In one sense, “processing” these masking stimuli signals means accessing digital audio files (such as *wav or .mp3 files) from a digital memory device 326 and “playing” the files to generate corresponding digital audio signals. In another sense, “processing” the masking stimuli signals means to determine which digital audio files to access from memory 326 based on which frequency ranges of narrow-band noise have been designated as chosen. In yet another sense, “processing” the masking stimuli signals means to generate the masking stimuli signals using an audio masking stimuli generator program executed by the processor 316. In any case, the masking stimuli signals are provided to a D/A converter 318 which converts them to analog audio signals. The analog audio signals at the output of the D/A converter 318 are amplified by an audio amplifier 320 where the level of amplification is controlled by a volume control 334 coupled to a controller 324. The amplified audio signals at the output of the amplifier 320 are provided to a sound generation device 322, which may be an audio speaker or other type of transducer that generates sound waves or mechanical vibrations which the user perceives as sound. The amplifier 320 and sound generation device 322 are referred to collectively herein as an audio output section 319 of the device 300.

In a preferred embodiment of the invention, the masking stimuli signals comprise narrow-band noise signals. However, it will be appreciated that other types of masking stimuli could be generated according to the invention, including frequency-modulated noise or speech babble noise. Thus, the invention is not limited to any particular type of masking stimuli.

As shown in FIG. 6, a manually operated momentary switch 328, also referred to herein as a push button 328, is provided for enabling the user of the device 300 to control various aspects of the operation and programming of the device 300. The push button 328 is preferably very small and located on an outer surface of a housing associated with the device 300. In an embodiment wherein the device 300 is worn on or in the ear of the user, the push button 328 is located on a portion of the housing that is accessible to the user while the user is wearing and using the device 300. For example, the device 300 may be configured as a behind-the-ear (BTE) or in-the-ear (ITE) instrument, with the push button 328 located on an accessible surface of the instruments. In an alternative embodiment of the invention, the wearer switches between available masking stimuli programs and chooses programs using a wireless remote control device 333, such as an infrared, radio-frequency or acoustic remote control.

In one alternative embodiment, the tinnitus masking device 300 is disposed in a housing suitable for tabletop use, such as on a bedside table. In this “tabletop” embodiment, the push button 328 and volume control 334 may be located on any surface of the housing that is easily accessible to the user. The sound generation device 322 of this embodiment is preferably a standard audio speaker such as may typically be used in a tabletop clock radio device. It could also have an extension pillow speaker.

The push button 328 is electrically connected to a controller 324 which generates digital control signals based on the state (open or closed) of the switch of the push button 328. In a preferred embodiment of the invention, the digital control signals are generated by the controller 324 based on how long the push button 328 is pressed. In this regard, a timer is included in the controller 324 for generating a timing signal to time the duration of the pressing of the button 328. Further aspects of the operation of the controller 324 and the push button 328 are described in more detail below.

Nonvolatile memory 326, such as read-only memory (ROM), programmable ROM (PROM), electrically erasable PROM (EEPROM), or flash memory, is provided for storing programming instructions, digital audio sound files and other operational parameters for the device 300. Preferably, the memory 326 is accessible by one or both of the processor 316 and the controller 324.

Figure 7:
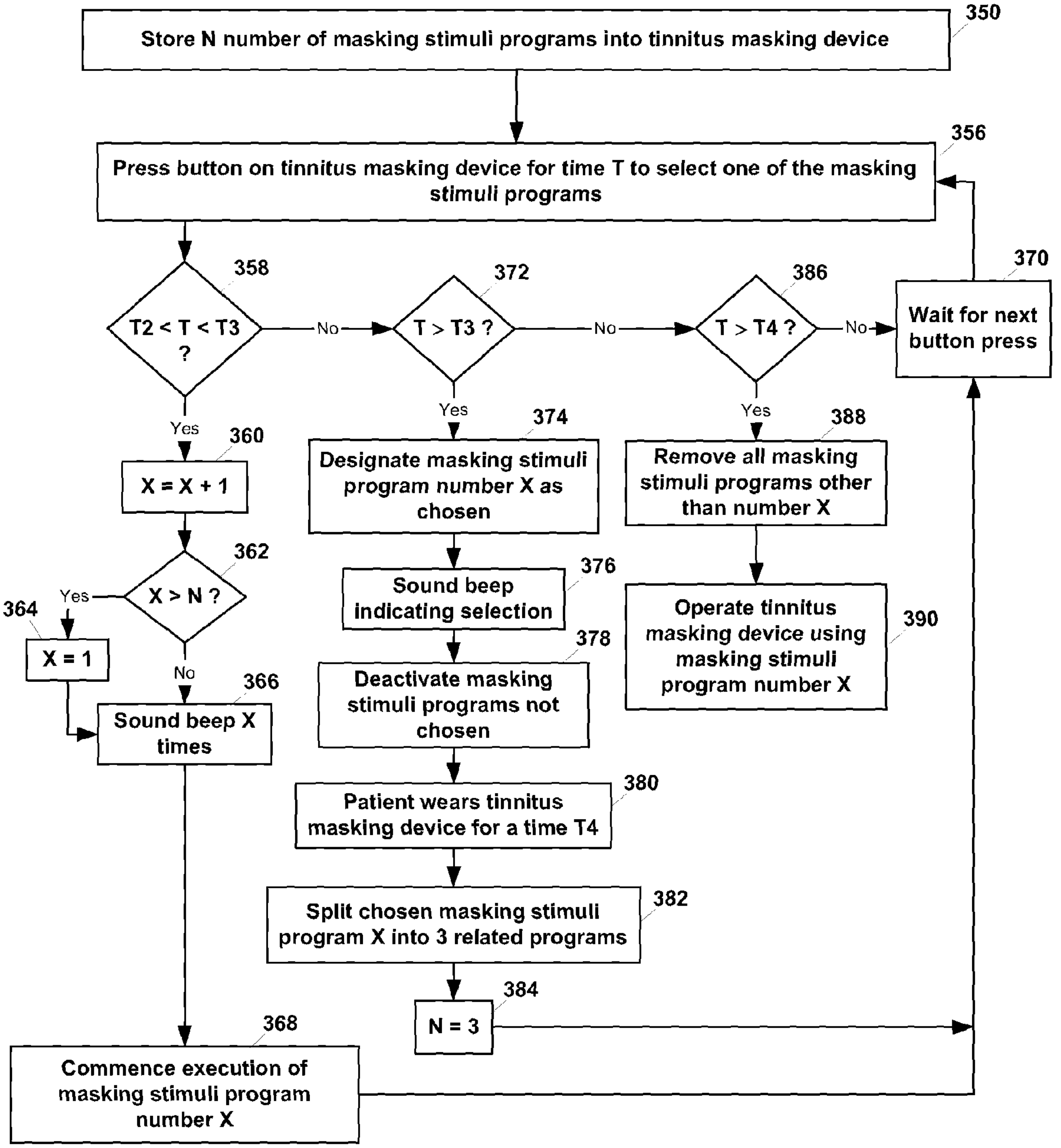
FIG. 7 depicts a functional flow diagram of the programming of a tinnitus masking device according to a preferred embodiment of the invention.

FIG. 7 depicts a process flow according to one preferred embodiment of the invention wherein the selection of most effective masking stimulus for tinnitus masking is based upon a “trial and error” interactive and iterative method where the user of the device 300 evaluates several options for noise frequency and chooses a frequency range that provides the best masking experience for the individual user. As shown in FIG. 7, a first step in the method is to store in memory various parameters for generating some number (N) of “programs” for generating narrow-band noise using the device 300 (step 350). When referring to the operation of the tinnitus masking device 300, a “program” may refer to various stored commands, values, settings or parameters that are accessed by masking stimuli generation software or firmware to cause the software or firmware to generate masking stimuli within a particular frequency band or masking having particular spectral aspects. In another sense, “program” may refer to a specific digital audio file (.wav, *mp3, etc.) containing masking stimuli, such as audio noise in a particular frequency band or having particular spectral aspects. The step 350 may be performed at the time of manufacture of the device 300 or at a later time, such as during a reprogramming procedure.

A user of the tinnitus masking device 300 can cycle through N number of available masking stimuli programs and evaluate each to determine which provides the best masking for the user’s tinnitus condition. The user does this by pressing the button 328 for at least some period of time T2, such as one second, to switch from one masking program to the next (step 356). For example, a first masking program may be activated when the device 300 is first powered on. When the wearer presses the button 328 for at least one second, a second masking program is loaded from memory 326 to the processor 316 and the device 300 generates two beeps (step 366) to indicate to the user that the second masking program is loaded. When the wearer presses the button 328 again for at least one second, a third masking program is loaded from memory 326 to the processor 316 and the device 300 generates three beeps to indicate that the third masking program is loaded. This continues until the user has cycled through the N number of masking programs. If the wearer presses the button 328 again for at least five seconds, the first program is loaded for execution again. This process is represented by steps 356-370 of FIG. 7.

If it is determined that the button 328 is pressed for less than one second (step 358), then no new masking program is loaded and the process waits for the next button press (step 370). This prevents inadvertent switching from one masking program to the next due to an accidental press of the button 328.

Once the user has had a chance to evaluate all of the available masking stimuli programs, the user may find that some smaller number of the programs, such as one or two, seem to be used the most because they provide the best masking performance for the user in various situations. For example, one of the masking stimuli programs may provide the best masking when the user is trying to sleep. Another of the masking stimuli programs may provide the best masking when the user is trying to concentrate while reading. A preferred embodiment of the invention allows the user to eliminate masking stimuli programs that are not used or rarely used, and to evaluate some additional masking stimuli programs that are variations on the best performing programs. This is accomplished by pressing the push button 328 for a time T3, such as 30 seconds, which is longer than the time T2, as described below.

As shown in FIG. 7, if it is determined that the button 328 is pressed for a time T3 or longer (step 372), the processor 316 sets a flag or stores a value indicating that the currently-loaded masking stimulus program has been designated as chosen (step 374). At this point, the device 300 generates a distinctive sound (step 376) to indicate to the user that a preferred masking stimulus program has been chosen. The masking stimuli programs not chosen are then deactivated (step 378). Deactivation in this sense means that the non-chosen programs are no longer available for selection using the procedure of repeated pressing of the button 328.

After the user has used the device 300 for some extended period of time T4 (step 380), such as 40 hours, the frequency band of the chosen program is “split” to provide two additional masking stimuli programs (step 382). In the preferred embodiment of the invention, the two new programs provide masking stimuli in two frequency bands that are sub-bands of the frequency band of the chosen masking stimuli program. For example, in a case where the chosen program provides masking stimuli in the 1000-3000 KHz band, one of the newly activated programs may cover 1000-2000 KHz and the other newly activated program may cover 2000-3000 KHz. At this point, three masking stimuli programs are available for continued use and evaluation (N=3, step 384).

The user can now switch between the three available masking stimuli programs using the button pressing procedure of steps 356-370 to decide which of the three provides the best masking performance. As described above, the user designates one of the three masking stimulus programs as chosen by pressing the button 328 for at least the time T3 (step 372). The process steps 374-384 are then performed based on the newly-chosen masking stimulus program. This selection procedure may be repeated any number of times to allow the user to “tune in” on the most effective masking stimulus program.

Once the user is satisfied with a particular masking stimulus program, the user presses the button 328 for a time T4, such as 30 seconds (step 386), at which point all non-chosen masking stimuli programs are removed or deactivated (step 388). From this point forward, the tinnitus masking device 300 operates indefinitely using the one selected masking stimulus program.

In an alternative embodiment of the invention, instead of pressing the button 328 to choose a masking stimuli program, the wearer presses the button 328 for at least time T3 to deactivate a non-chosen program. Thus, it will be appreciated that the invention is not limited to the manner in which masking stimuli programs are designated as chosen or not chosen.

As with the hearing assistance device 10, the tinnitus masking device 300 may be reset to default (factory) conditions by the user. In one embodiment, the reset is initiated by pressing the push button 328 for an extended time T5 which is significantly longer than T4, such as two minutes. In another embodiment, the reset is initiated by closing the battery compartment while simultaneously pressing the button 328. In yet another embodiment, the reset is initiated using the wireless remote control device 333.

In one alternative embodiment, the invention provides a hearing assistance device which is combination hearing aid and tinnitus masker. This embodiment comprises components as depicted in FIG. 1, which include the push button 28 for controlling the selection of hearing aid acoustical configuration programs for the hearing aid function (as described in FIGS. 2-5) and a second push button 328 for controlling the selection of masking stimuli programs for the tinnitus masking function (as described in FIG. 7). Alternatively, a single push button may be used for first programming the hearing aid functions and then programming the tinnitus masking functions. Those skilled in the art will appreciate that the processor 16 and controller 24 may be programmed to implement the hearing aid functions and the tinnitus masking functions simultaneously.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A programmable apparatus for improving perception of sound by a person, the apparatus comprising:

a portable housing configured to be worn behind the ear or in the ear of the person;

a processor disposed in the portable housing for executing one or more available programs for processing digital audio signals based on control signals;

a digital-to-analog converter disposed in the portable housing for generating output analog audio signals based on the digital audio signals;

an audio output section disposed in the portable housing for receiving and amplifying the output analog audio signals, generating audible sound based thereon and providing the audible sound to the person;

memory disposed in the portable housing for storing a plurality of preloaded programs for processing the digital audio signals, the memory accessible to the processor;

means disposed in or on the portable housing that is operated by the person for generating a first control signal to switch from one of the preloaded programs to another of the preloaded programs;

means disposed in or on the portable housing that is operated by the person for generating a second control signal to designate at least one of the preloaded programs as a chosen program;

the processor for ceasing execution of one of the preloaded programs and commencing execution of another of the preloaded programs based upon the first control signal; and the processor for designating at least one of the preloaded programs as a chosen program based upon the second control signal and for designating any preloaded program that is not a chosen program as a deactivated program.

2. The apparatus of claim 1 where the means for generating the first control signal and the means for generating the second control signal comprise:

a momentary push button switch which changes from a first state to a second state when activated by the person; and a controller in communication with the momentary push button switch and the processor, the controller for generating the control signals based on periods of time during which the momentary push button switch is in the second state, the controller for generating the first control signal when the momentary push button switch is in the second state for a period of time exceeding a first time, and for generating the second control signal when the momentary push button switch is in the second state for a period of time exceeding a second time.

3. The apparatus of claim 2 wherein the momentary push button switch is attached to the portable housing.

4. The apparatus of claim 1 wherein the means for generating the first control signal and the means for generating the second control signal comprise a voice-recognition program executed on the processor of the apparatus.

5. The apparatus of claim 1 wherein the apparatus is a hearing aid device and the plurality of preloaded programs comprise acoustical configuration programs.

6. The apparatus of claim 1 wherein the apparatus is a tinnitus masking device and the plurality of preloaded programs comprise masking stimuli programs.

7. The apparatus of claim 1 wherein:

the memory stores an least N number of the preloaded programs, including at least a first available program, a second available program, a third available program, an Nth−1 available program and an Nth available program;

the processor ceases execution of the first available program and commences execution of the second available program upon a first receipt of the first control signal, the processor ceases execution of the second available program and commences execution of the third available program upon a second receipt of the first control signal, the processor ceases execution of the third available program and commences execution of the fourth available program upon a third receipt of the first control signal, the processor ceases execution of the Nth−1 available program and commences execution of the Nth available program upon an Nth−1 receipt of the first control signal, and the processor ceases execution of the Nth available program and commences execution of the first available program upon an Nth receipt of the first control signal.

8. The apparatus of claim 1 wherein:

the memory stores the plurality of preloaded programs including a plurality of available programs and a plurality of deactivated programs;

the processor designates one of the available programs as a first chosen program upon a first receipt of the second control signal;

the processor designates another of the available programs as a second chosen program upon a second receipt of the second control signal; and the processor designates all programs that are not the first chosen program or the second chosen program as deactivated programs.

9. The apparatus of claim 1 further comprising:

a timer for timing how long each of the one or more preloaded programs is used in processing digital audio signals; and the processor for designating at least one of the preloaded programs as a chosen program based upon how long one or more of the preloaded programs are used in processing digital audio signals.

10. The apparatus of claim 9 wherein the processor designates two preloaded programs having the most usage time as chosen programs.

11. The apparatus of claim 1 wherein, for each chosen program, the processor designates as available one or more secondary programs that are related to the chosen program.

12. The apparatus of claim 1 further comprising:

at least one microphone for receiving sound signals and generating input analog audio signals based thereon;

at least one analog-to-digital converter circuit for receiving the input analog audio signals from the at least one microphone and generating the digital audio signals based thereon; and the processor for receiving the digital audio signals from the analog-to-digital converter circuit and for executing the one or more available programs for processing the digital audio signals.

13. A method for improving perception of sound by a person, the method performed by components of a hearing aid apparatus contained in a portable housing configured to be worn behind the ear or in the ear of the person, the method comprising:

(a) storing in a memory device in the portable housing one or more available programs for processing digital audio signals, the storing performed during manufacture of the hearing aid apparatus;

(b) processing the digital audio signals based on execution of the one or more available programs;

(c) generating output analog audio signals based on the digital audio signals processed in step (b);

(d) receiving and amplifying the output analog audio signals to generate audible sound based thereon;

(e) generating a first control signal to switch from one available program to another available program based upon operation by the person of a momentary push button switch on the portable housing;

(f) generating a second control signal to designate at least one of the available programs as a chosen program based upon operation by the person of the momentary push button switch on the portable housing;

(g) ceasing execution of one of the available programs and commencing execution of another of the available programs based upon the first control signal;

(h) designating at least one of the available programs as a chosen program based upon the second control signal; and (i) designating any available program that is not a chosen program as a deactivated program.

14. The method of claim 13 wherein:

steps (e) and (f) include activating the momentary push button switch to momentarily change a state of the switch from a first state to a second state;

step (e) includes generating the first control signal when the momentary push button switch is in the second state for a period of time exceeding a first time; and step (f) includes generating the second control signal when the momentary push button switch is in the second state for a period of time exceeding a second time.

15. The method of claim 13 wherein step (a) includes storing in the memory device one or more available acoustical configuration programs for processing the digital audio signals; and step (b) includes processing the digital audio signals based on execution of the one or more available acoustical configuration programs.

16. The method of claim 13 wherein step (a) includes storing in the memory device one or more available masking stimuli programs for processing the digital audio signals; and step (b) includes processing the digital audio signals based on execution of the one or more available masking stimuli programs.

17. The method of claim 13 further comprising:

(j) timing how long each of the one or more available programs is used in processing digital audio signals; and step (h) including designating at least one of the available programs as a chosen program based upon how long the at least one available program is used in processing digital audio signals.

18. A programmable apparatus for improving perception of sound by a person, the apparatus comprising:

a processor for executing one or more available programs for processing digital audio signals based on control signals;

a digital-to-analog converter for generating output analog audio signals based on the digital audio signals;

an audio output section for receiving and amplifying the output analog audio signals, generating audible sound based thereon and providing the audible sound to the person;

memory for storing one or more programs for processing the digital audio signals, the memory accessible to the processor;

means for generating a first control signal to switch from one available program to another available program based upon an action by the person;

the processor for ceasing execution of one of the available programs and commencing execution of another of the available programs based upon the first control signal; and timer means for measuring how long each of the one or more available programs are executed in processing the digital audio signals;

the processor for designating at least one of the available programs as a chosen program based upon how long the at least one available program was executed in processing the digital audio signals and for designating an available program that is not a chosen program as a deactivated program; and at least one housing which contains the processor, digital-to-analog converter, audio output section, memory, means for generating a first control signal, means for generating a second control signal and timer means.

19. A programmable apparatus for improving perception of sound by a person, the apparatus comprising:

a portable housing configured to be worn behind the ear or in the ear of the person;

a processor disposed in the portable housing for executing one or more available programs for processing digital audio signals based on control signals;

a digital-to-analog converter disposed in the portable housing for generating output analog audio signals based on the digital audio signals;

an audio output section disposed in the portable housing for receiving and amplifying the output analog audio signals, generating audible sound based thereon and providing the audible sound to the person;

memory disposed in the portable housing for storing a plurality of preloaded programs for processing the digital audio signals, the preloaded programs including a plurality of available programs and a plurality of deactivated programs, the memory accessible to the processor;

means disposed in or on the portable housing that is operated by the person for generating a first control signal to switch from one of the preloaded programs to another of the preloaded programs;

means disposed in or on the portable housing that is operated by the person for generating a second control signal to designate at least one of the preloaded programs as a chosen program;

the processor for ceasing execution of one of the preloaded programs and commencing execution of another of the preloaded programs based upon the first control signal; and the processor for designating one of the preloaded programs as a first chosen program based upon a first receipt of the second control signal, for designating one of the preloaded programs as a second chosen program based upon a second receipt of the second control signal, and for designating all preloaded programs that are not the first chosen program or the second chosen program as deactivated programs.

20. A programmable apparatus for improving perception of sound by a person, the apparatus comprising:

a portable housing configured to be worn behind the ear or in the ear of the person;

a processor disposed in the portable housing for executing one or more available programs for processing digital audio signals based on control signals;

a digital-to-analog converter disposed in the portable housing for generating output analog audio signals based on the digital audio signals;

an audio output section disposed in the portable housing for receiving and amplifying the output analog audio signals, generating audible sound based thereon and providing the audible sound to the person;

memory disposed in the portable housing for storing a plurality of preloaded programs for processing the digital audio signals, the memory accessible to the processor;

means disposed in or on the portable housing that is operated by the person for generating a first control signal to switch from one of the preloaded programs to another of the preloaded programs;

means disposed in or on the portable housing that is operated by the person for generating a second control signal to designate at least one of the preloaded programs as a chosen program;

the processor for ceasing execution of one of the preloaded programs and commencing execution of another of the preloaded programs based upon the first control signal;

the processor for designating at least one of the preloaded programs as a chosen program based upon the second control signal; and for each chosen program, the processor for designating as available one or more secondary programs that are related to the chosen program.

* * * * *